July 22, 1947.  E. I. EIGENBERGER  2,424,227
SYNCHRONOUS MOTOR CONTROL SYSTEM
Filed April 16, 1945
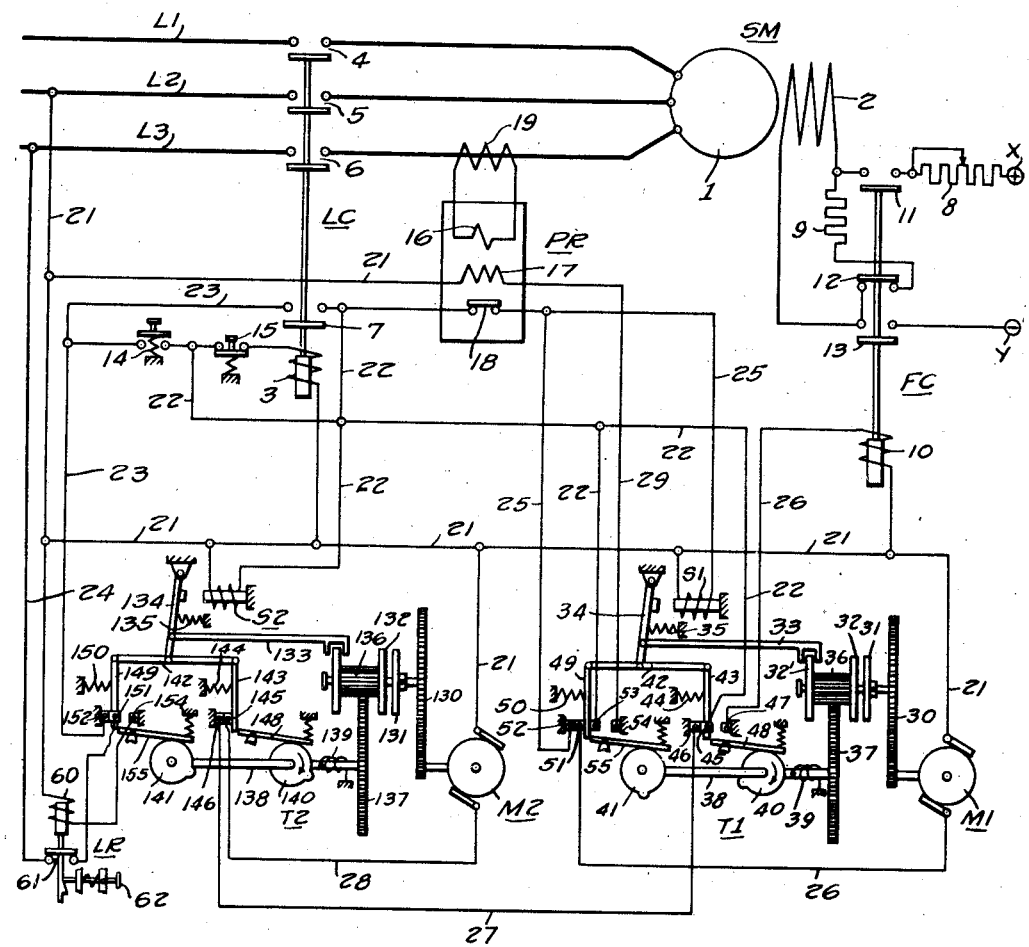
WITNESSES:
INVENTOR
Elroy I. Eigenberger.
BY
ATTORNEY Patented July 22, 1947

2,424,227

UNITED STATES PATENT OFFICE 2,424,227

SYNCHRONOUS MOTOR CONTROL SYSTEM

Elroy I. Eigenberger, Forest Hills, Pa., assignor to Westinghouse Electric & Manufacturing Company, East Pittsburgh, Pa., a corporation of Pennsylvania Application April 16, 1945, Serial No. 588,468

6 Claims. (Cl. 172—289)

My invention relates to control systems for starting and resynchronizing synchronous motors and has for its general object the provision of a control system which protects the damper windings of the motor from being damaged due to too frequent synchronization.

The damper windings of synchronous motors are usually designed for the normally expected duty. Frequently repeated starting and resynchronizing operations impose on these windings an increased duty which may exceed their thermal capacity thus causing damage to the motor.

The customary control systems for synchronous motors are usually provided with a power factor relay or the like apparatus which, on pullout or other disturbances affecting the power factor, becomes operative to disconnect the motor from the line, or to resynchronize the motor by first deenergizing its direct-current field and thereafter reapplying the field after the elapse of a period determined by a timing device having a time constant of sufficient duration to permit the motor to again approach synchronous speed. Such resynchronizing control systems are designed with the expectation that the resynchronizing operation will not occur too often and that, after one or possibly two attempts have been made, the motor will again operate as a synchronous motor. If, however, the cause of the motor pull-out has not been removed or reoccurs, the motor field will be repeatedly applied by the timing device and will each time be removed again by the power factor relay. This repetitive operation may continue indefinitely so that the motor operates virtually all the time as an induction motor rather than as a synchronous motor. The load current is then carried by the damper windings which, being designed for intermittent duty only, become overheated and damaged.

It is, therefore, a more specific object of my invention to provide a control system in which the damper windings of the synchronous motors are protected from overloading by a reliable automatic limitation of the number of resynchronizing operations which can be performed during any starting period; and it is also aimed at securing such a limitation with the aid of timing means that readily permit an adjustment or selection of the maximum number of tries within a wide range of adjustment and in accordance with the requirements of any particular application.

These and other objects of my invention will be apparent from the following description of an embodiment thereof illustrated diagrammatically in the drawing.

Referring to the illustrated control system, the synchronous motor SM is schematically represented by a primary or stator winding 1 including the damper windings, and a field winding 2. The primary motor windings are connected to the alternating current mains L1, L2 and L3 by the line contactor LC. The coil 3 of contactor LC controls three main contacts 4, 5 and 6 and a control contact 7. The motor field winding 2 is connected to the terminals X and Y of a suitable direct-current source through an adjustable field rheostat 8. A discharge resistor 9 is provided for connection across the field winding 2. The field connections are controlled by a field contactor FC whose control coil 10 operates three contacts 11, 12 and 13, respectively.

The control means for operating the two contactors LC and FC in the proper sequence comprise a normally open start button 14, a normally closed stop button 15, a power factor relay PR, two timing relays T1 and T2, and a lockout relay LR.

The power factor relay PR has a current coil 16 and a voltage coil 17 both acting on a contact 18 which is closed when the current coil 16 is sufficiently energized and which opens when both coils 16 and 17 are excited under operating conditions of motor SM involving an excessive decrease in power factor. Current coil 16 is connected to a current transformer 19 which measures the load current in one of the supply mains of the synchronous motor. The various control elements of the system are interconnected by a network composed of a group of conductors denoted by 21 through 29.

The two timing relays T1 and T2 are largely similar as regards mechanical construction and, in the drawing, reference characters, having a similarity readily apparent from an inspection, designate corresponding parts.

Motors M1 and M2 are of the small synchronous type as used in electric clocks. Motor M1 through a pinion on the motor shaft drives a spur gear 30 carrying a clutch disc 31. An elongated pinion 36, disposed in axially displaceable relation to the clutch disc 31, is provided with a clutch disc 32 at the end adjacent to disc 31 and is provided with an actuating disc 32' at its other end. The actuating disc 32' is controlled by a bifurcated link 33. Link 33 is attached to the armature 34 of the magnet S1. A compression spring 35 biases the armature 34 away from the magnet S1 and hence tends to hold the discs 32 and 31 disengaged. Pinion 36 meshes with an axially shorter spur gear 37 whereby their meshing relation is maintained regardless of whether the discs 31 and 32 are engaged or disengaged. Gear 37 drives a shaft 38 in opposition to a return bias imposed thereon by a spring 39. Two cams 40 and 41 are fastened to shaft 38 preferably in such a manner that their angular position relative to the shaft and relative to each other can be adjusted in accordance with the desired timing operation of the relay.

A mechanical transmission, here represented by a link 42, is connected with the armature 34 of magnet S1 and is pivoted to a contact lever 43. A biasing spring 44 tends to move member 43 counterclockwise about its pivot axis at link 42. Member 43 carries a contact 45 which, in the illustrated position, is in engagement with a stationary contact 46 and, when permitted to follow the bias of spring 44, switches over into engagement with another stationary contact 47. Normally, such switching is prevented by a latch lever 48 which holds contact 45 in engagement with stationary contact 46. Upon rotation of cam 40, in opposition to the torsion spring 39, the latch lever 48 is lifted when the projection of cam 40 engages the lever 48 so that then the just-mentioned switching operation of contact 45 occurs.

A second contact member 49 biased by a spring 50 is pivoted to link 42. A contact 51 on member 49 is normally in engagement with a stationary contact 52. A second contact 53 on member 49 is normally separated from a second stationary contact 54 but is closed when the latching lever 55 is lifted by the cam 41.

As mentioned previously, the relay T2 is structurally similar to relay T1. It should be noted, however, that the two relays have usually different timing periods and also that their magnets (S1, S2) and drive motors (M1, M2) as well as the appertaining relay contacts are differently connected in the control system.

As will be apparent from the description of the operation of the system given below, relay T1 serves mainly to maintain the power factor relay PR inoperative during the initial period of each starting or synchronizing cycle of the synchronous motor SM and introduces the relay PR after each starting or resynchronizing only when motor SM has accelerated up to nearly synchronous speed and after the direct-current excitation has been applied to the motor field winding 2 by the field contactor FC. As a rule, relay T1 has a relatively short timing period which is effective after each starting or each try of resynchronization and which begins anew for each such try. That is, the above described mechanism, including the spring 39 and the coupling members 31, 32 under control by the magnet S1, resets the relay T1 to starting conditions after the completion of each try.

In contrast thereto, relay T2 serves to limit the number of such tries. Relay T2 may have a relatively long timing period as compared with relay T1 but this period is effective cumulatively so that the periods of several tries are integrated up to a predetermined maximum. Only upon the occurrence of such a maximum does the relay T2 perform its switching operation and thereafter reset itself for another integrating sequence.

The above-mentioned lockout relay LR is associated with relay T2. The coil 60 of relay LR, when energized, opens a normally closed contact 61 which is then latched in the open position and can be closed only by the actuation of a reset button 62.

Starting from the condition of rest, the synchronous motor SM is started by depressing the start button 14. This closes the coil circuit of line contactor LC through the circuit elements: L2, 21, 3, 15, 14, 23, 152, 151, 61, 24, L3 (circuit 1). Contactor LC picks up and closes the primary circuit of the synchronous motor SM. At the same time, a self-holding circuit for coil 3 is closed at contact 7: L2, 21, 3, 15, 22, 7, 23, 152, 151, 61, 24, L3 (circuit 2). Due to this self-holding circuit, the line contactor LC remains closed after the release of start button 14 and drops out only when the stop button 15 is thereafter depressed.

The closure of contact 7 in contactor LC also completes the circuit of the electromagnet S2 in timing relay T2: L2, 21, S2, 22, 7, 23, 152, 151, 61, 24, L3 (circuit 3).

The closure of contact 7 has further the effect of energizing the motor M2 in relay T2 through the contacts 45 and 46 of relay T1: L2, 21, M2, 26, 145, 146, 27, 46, 45, 22, 7, 23, 152, 151, 61, 24, L3 (circuit 4). Motor M2 now starts running while electromagnet S2 attracts the armature 134 thus preparing linkage 142 with members 143 and 149 for the subsequent switching operation. However, members 143 and 149 remain stopped in the illustrated position by the latching levers 148 and 155, respectively. The actuation of armature 134 has the effect of moving clutch member 132 into closed position so that motor M2 drives the cams 140 and 141 in the direction indicated by an arrow.

With current flowing through the primary circuit of the synchronous motor SM, contact 18 of the power factor relay PR is closed. The closure of contacts 7 and 18 completes an energizing circuit for motor M1 of timing relay T1: L2, 21, M1, 26, 51, 52, 25, 18, 7, 23, 152, 151, 61, 24, L3 (circuit 5). Magnet S1 of relay T1 is likewise energized through contact 18 of relay PR: L2, 21, S1, 25, 18, 7, 23, 152, 151, 61, 24, L3 (circuit 6).

Magnet S1 attracts its armature 34 and moves clutch member 32 into closed position so that motor M1 drives cams 40 and 41 in the direction indicated by an arrow.

Upon the closure of the line contactor LC, the synchronous motor SM accelerates with its field winding 2 deenergized. After the elapse of a chosen timing period, for instance of 10 seconds, during which motor SM approaches synchronous speed, cam 40 of relay T1 entrains the latch lever 48 and releases contact lever 43 so that the latter is free to follow the biasing force of spring 44. Contact 45 now switches from contact 46 to contact 47. As a result, the circuit (3) of motor M2 is interrupted between contacts 45 and 46 and motor M2 stops while magnet S2 remains energized and coupling member 132 clutched in. Furthermore, the circuit of coil 10 in field contactor FC is closed between contacts 45 and 47: L2, 21, 10, 26, 47, 45, 22, 7, 23, 152, 151, 61, 24, L3 (circuit 7).

Field contactor FC picks up and disconnects the discharge resistor 9 at contact 12 while closing the motor field circuit at contacts 11 and 13. Normally, the motor SM is now pulled into synchronism.

After a further timing period of, say, 5 seconds, cam 41 of relay T1 releases the latch 55 so that contacts 51 and 52 open and contacts 53 and 54 close. Now, the circuit (5) of motor M1 is interrupted between contacts 51 and 52 so that this motor stops; and voltage coil 17 of power factor relay PR is now connected between mains L2 and L3 by the closure of contacts 53 and 54 in the circuit: L2, 21, 17, 29, 54, 53, 22, 7, 23, 152, 151, 61, 24, L3 (circuit 8).

From now on, motor SM is under control by the power factor relay PR. As long as the motor runs fully or sufficiently in synchronism, contact 18 remains closed and no further control operation occurs until the stop button 15 is depressed. If the motor SM falls out of step to an extent determined by the setting of relay PR or if the motor fails to properly synchronize during the performance of relay T1, the contact 18 is opened. This interrupts the circuit (5) of motor M1 and also the circuit (6) of magnet S1. The armature 34 of magnet S1 is released thereby disengaging the coupling between elements 31 and 32. As a result, shaft 38 and gears 37 and 36 are free to follow the biasing force of return spring 39 and hence are reset to the initial position in order to be ready for another timing sequence. The linkage elements 42, 43, 49 are also reset by the biasing springs 35, 44 and 50 to the illustrated latching position. The resetting of members 43 and 49 has the effect of opening the circuit (7) of coil 10 so that contactor FC drops out and opens the circuit (8) of the voltage coil 17 so that relay PR is again inoperative in order to be ready for a new synchronizing cycle. Contact 18 of relay PR closes immediately afterward and re-energizes magnet S1 so that the linkage elements 42, 43, 49 are again placed into condition for another actuation under control by cams 40 and 41, and a new timing operation of relay T1 is started. Circuit (3) of motor M2 is again closed between contacts 45 and 46 so that motor M2 in relay T2 also starts running.

It will be remembered that during the first timing period, motor M2 was in operation for the above-mentioned interval of 10 seconds elapsing between the actuation of start button 14 and the switching in of field contactor FC. During this past running interval of motor M2, with magnet S2 remaining energized all the time, the cams 140 and 141 of relay T2 rotated a corresponding angle without releasing the latches 148 and 155. Hence when the second timing period or try is started, the operation of motor M2, during a further interval of 10 seconds, has the effect of rotating the cams 140 and 141 an additional amount. That is, the repetitive operation of motor M2 acts cumulatively as regards the angular adjustment of cams 140 and 141.

After a predetermined number of tries effected by relay T1, this number depending upon the selected total timing period of relay T2, the cams 140 and 141 reach simultaneously a position in which the latches 148 and 155 are released. As a result, the circuit (3) of motor M2 is interrupted between contacts 145 and 146. At the same time, the engagement between contacts 151 and 152 is interrupted. This opens the self-holding circuit (2) of line contactor LC so that the primary motor connections are interrupted at main contacts 4, 5 and 6. Contact 7 of line contactor LC opens also, and the entire control system becomes deenergized. Armature 134 of relay T2 drops back into the illustrated position due to the biasing force of spring 135 and disengages coupling member 132 from the motor driven coupling member 131 so that the biasing spring 139 returns cams 140 and 141 into the initial position, thereby resetting the apparatus for a new series of operations. Before the resetting occurs, the contact between elements 151 and 154 in relay T2 is closed, thereby completing a circuit for coil 60 in relay LR. Relay LR picks up and thereby interrupts its own coil circuit at contact 61. This contact becomes latched in the open position so that the relay stays picked up until the push button 62 is actuated. Since the entire auxiliary equipment of the control system was energized through the now open contact 61, the automatic resetting of relay T2 does not have the effect of starting a new series of tries unless the control buttons 62 and 14 are operated in the proper sequence.

The number of tries permitted by relay T2 can be adjusted from one to a maximum number by fastening the cams 141 and 142 in a corresponding angular position relative to shaft 138. Since both cams perform simultaneous releasing operations, they may be replaced by a single cam acting on a single latch lever, if desired. The timing of relay T2 is preferably set for slightly more than the time needed for the initial timing interval of relay T1 plus the reapplication time of the motor field. For instance, at a first timing interval of 10 seconds and an additional time of 5 seconds required for the above-exemplified operation of relay T1, the total timing period of relay T2 for a single attempt to resynchronize may be slightly more than 20 seconds.

The use of lockout relay LR in the above-described system serves the purpose of preventing a renewed operation after the performance of a given number of starting or resynchronizing operations unless an authorized person to whom only the button 62 is accessible has reset the system for proper operation. In cases where such special protection is unnecessary or undesired, the lockout relay LR can be omitted by connecting the leads 23 and 24 directly with each other and providing the member 149 in relay T2 with a simple break contact series connected in the circuit of the stop button 15, for instance between elements 15 and 3. Then, the relay T2 when reaching its time limit will deenergize the coil 3 of line contactor LC and thus produce the same effect as an actuation of the stop button 15, i. e. the system can be started for another series of operations by merely depressing the start button 14.

It will be understood by those skilled in the art that control systems according to the invention can be modified in various other respects within the gist of the invention and without departing from its essential features as set forth in the claims annexed hereto.

I claim as my invention:

1. A control system for a synchronous motor, comprising primary connections disposed for supplying alternating current to the motor and being provided with primary control means for controlling the flow of the alternating current, direct current circuit means for supplying field excitation to the motor, timing means connected between said control means and said circuit means for controlling said circuit means so as to apply the field excitation a timing interval after the beginning of the alternating current application, a power factor relay associated with said primary connections for controlling said circuit means so as to terminate the field excitation in response to the occurrence of an excessive decrease in power factor of the alternating current, and a control device disposed for causing an interruption of said primary connections when the number of successive operations of said timing means reaches a predetermined maximum, said control device having an intermittently operating timing mechanism associated with said timing means so as to progressively advance one step for each of said timing operations and being provided with contact means for controlling said primary control means, said contact means being controlled by said mechanism to perform a switching operation for causing said primary control means to interrupt said current flow at the end of a predetermined total amount of progression.

2. A control system for a synchronous motor having primary alternating-current windings and a direct current field winding, comprising connections attached to said primary windings for supplying alternating current thereto, a contactor having contacts arranged in said connections for controlling said current and having a winding for closing said contacts when energized, a control network connected to said winding for energizing it during the periods of operation of the motor and including a normally closed break contact for deenergizing said winding when opened, direct current circuit means for supplying field excitation to the motor, timing means controlled by said network and connected with said circuit means so as to apply the field excitation a timing interval after the beginning of the alternating current application, a power factor relay associated with said primary connections for controlling said circuit means so as to terminate the field excitation in response to the occurrence of an excessive decrease in power factor of the alternating current, and a control device having integrating means associated with said timing means so as to progressively assume a cumulative condition indicative of the number of recurrence of operation of said timing means, said control device being connected to said break contact for opening it in response to the occurrence of a predetermined maximum condition of said integrating means.

3. A control system for a synchronous motor, comprising primary connections disposed for supplying alternating current to the motor and being provided with control means for controlling the flow of the alternating current, direct current circuit means for supplying field excitation to the motor, relay means associated with said primary connections and for controlling said circuit means so as to terminate the field excitation in response to the occurrence of an excessive decrease in power factor of the alternating current, timing means controlled by said control means and connected to said field circuit means and to said relay means for applying said field excitation a timing interval after the beginning of the alternating current application and thereafter placing said relay means in operative condition, said timing means including a resetting mechanism operative after each complete timing operation to restore said timing means to starting conditions, and a control device disposed for causing an interruption of said primary connections when the number of successive operations of said timing means reaches a predetermined maximum, said control device having an intermittently operating timing mechanism associated with said timing means so as to progressively advance one step for each of said timing operations and being provided with contact means controlled by said mechanism to perform a switching operation for causing said interruption at the end of a predetermined total amount of progression, said control device having also a resetting mechanism controlled by said contact means to restore the device to starting conditions at the end of said total progression.

4. A control system for a synchronous motor having primary alternating-current windings and a direct current field winding, comprising connections attached to said primary windings for supplying alternating current thereto, a contactor having contacts arranged in said connections for controlling said current and having a winding for closing said contacts when energized, a control network connected to said winding, a holding circuit controlled by said contactor for maintaining said winding energized during the periods of operation of the motor and a break contact in said holding circuit for terminating said operation when actuated, field circuit means connected to said field winding for supplying direct current excitation therefor, relay means associated with said primary connections and for controlling said circuit means so as to terminate the field excitation in response to the occurrence of an excessive decrease in power factor of the alternating current timing means controlled by said control means and connected to said field circuit means and to said relay means for applying said field excitation a timing interval after the beginning of the alternating current application and thereafter placing said relay means in operative condition, a control device disposed for causing an interruption of said primary connections when the number of successive operations of said timing means reaches a predetermined maximum, said control device having an intermittently operating timing mechanism associated with said timing means so as to progressively advance one step for each of said timing operations and being connected with said break contact in order to open said contact at the end of a predetermined total amount of progression, and electromagnetic means forming part of said control device for resetting said mechanism after each opening of said contact, said electromagnetic resetting means being connected with said holding circuit so as to remain inoperative while said winding is energized.

5. A control system for a synchronous motor having primary alternating current windings and a direct current field winding, comprising primary control means having contacts for controlling the supply of alternating current to said primary windings and having a control winding for controlling said contacts, field control means for controlling the supply of direct current to said field winding, a power factor relay for interrupting said direct current in response to an excessive reduction in power factor of said alternating current, control devices including timing means for causing sequentially and in timed intervals said primary control means to start supplying alternating current and said field control means to start applying direct current and said relay to change from inoperative to operative condition, and a control device having a movable member controlled by said timing means so as to advance progressively during successive timing sequences of said timing means an energizing network connected to said control winding to said timing means and to said control device and including a back contact associated with and controlled by said control device in order to control said primary control means and said field control means to terminate said respective supply of current when the total amount of progressive advance of said control device reaches a predetermined magnitude.

6. A control system for a synchronous motor having primary alternating-current windings and a direct current field winding, comprising primary control means having contacts for controlling the supply of alternating current to said primary windings and having a coil circuit for controlling said contacts, field control means for controlling the supply of direct current to said field winding, a power factor relay for interrupting said direct current in response to an excessive reduction in power factor of said alternating current, control devices associated with said coil circuit and with said relay and including timing means for causing sequentially and in timed intervals said primary control means to start supplying alternating current and said field control means to start supplying direct current and said relay to change from inoperative to operative condition, and a control device having a timing contactor of intermittent and cumulative operation associated with said timing means so as to advance progressively one step for each operating sequence of said timing means, said control device having contact means disposed in said coil circuit for controlling said coil circuit in order to cause said primary control means and said field control means to terminate said respective supply of current when the number of consecutive steps of progression reaches a predetermined magnitude, and adjusting means forming part of said control device for selecting said magnitude.

ELROY I. EIGENBERGER.

REFERENCES CITED

The following references are of record in the file of this patent:

UNITED STATES PATENTS

| Number | Name | Date |
|---|---|---|
| 1,711,106 | Anderson | Apr. 30, 1929 |
| 1,790,485 | Raney | Jan. 27, 1931 |
| 1,959,166 | Kaufmann | May 15, 1934 |
| 2,200,105 | Stephenson | May 7, 1940 |